United States Patent [19]
Arai

[11] Patent Number: 5,494,427
[45] Date of Patent: Feb. 27, 1996

[54] PRESSURE SENSING DEVICE FOR INJECTION MOLDING MACHINES

[75] Inventor: Tsuyoshi Arai, Nagano, Japan

[73] Assignee: Nissei Plastic Industrial Co., Ltd., Negano, Japan

[21] Appl. No.: 292,972

[22] Filed: Aug. 22, 1994

[30] Foreign Application Priority Data

Sep. 8, 1993 [JP] Japan ................................. 5-247571

[51] Int. Cl.$^6$ ................................................ B29C 45/77
[52] U.S. Cl. ............................................ 425/145; 264/40.7
[58] Field of Search .................................... 425/145, 149; 264/40.7

[56] References Cited

FOREIGN PATENT DOCUMENTS 312528  2/1991  Japan .
550483  3/1993  Japan .

Primary Examiner—Tim Heitbrink
Attorney, Agent, or Firm—Birch, Stewart, Kolasch & Birch

[57] ABSTRACT

A hydraulic pressure cylinder incorporating a double-rod type piston, for example an injection cylinder has a pair of pressure sensors for detecting the hydraulic pressures of fore and rear oil chambers. are respectively detected by a pair of pressure sensors 4, A detected pressure value Pd is subsequently obtained from the difference between respective oil chamber pressure measurements Pdf, Pdr based on the outputs respectively from pressure sensors. The detected pressure value Pd of period Ts during which detected pressure value Pd becomes zero theoretically, is calculated in advance. The calculated detected pressure value Pd is stored as correction value A. At the time of pressure sensing, the detected pressure value Pd is corrected according to correction value A, whereby the accurate zero adjustment point may always be maintained without being influenced by a temperature drift, enabling an accurate and high-precision pressure sensing.

12 Claims, 3 Drawing Sheets

PRESSURE SENSING DEVICE FOR INJECTION MOLDING MACHINES

1. Field of the Invention

The present invention relates to a pressure sensing device for injection molding machines, to detect the pressure of a hydraulic cylinder such as an injection cylinder, etc.

2. Description of the Relevant Art

An injection molding machine capable of moving a screw by an injection cylinder incorporating a double-rod type piston is disclosed in Japanese Patent Publication Laid-Open No. 5 (1993)-50483. This type of injection cylinder is provided with a fore and a rear rod, in front and behind the piston. Both rods have an identical diameter. A fore oil chamber is provided in front of the piston within the injection cylinder while a rear oil chamber is likewise formed in the rear thereof. Therefore, control of the screw in its forward and backward movements, and in a stop position can be performed by simultaneously applying hydraulic pressure to each of these oil chambers. It is noted here that the fore rod is coupled to the rear end of the screw inserted in a barrel cylinder while the rear rod is spline-joined to the shaft of an oil motor installed at the rear end of the injection cylinder.

Normally, when detecting screw pressure, hydraulic pressures of the oil chamber inside the injection cylinder are detected by using a pressure sensing device( see Japanese Patent publication Laid-Open No. 3 (1991)-12528).

Therefore, with the injection cylinder having a built-in double-rod type piston, the hydraulic pressures of the fore and rear oil chamber are respectively detected, using a pair of pressure sensors. After the detected pressure therefrom are respectively amplified by head amplifiers, the outputs therefrom are subsequently sent to a deviation computing unit wherein a pressure deviation across the fore and rear oil chambers is calculated. This deviation denotes a screw pressure to be detected.

Meanwhile, such a pressure sensing device as described above uses a strain gauge as a pressure sensor, with the measurement of pressure provided thereby being inclusive of those errors stemming from the functional fluctuation characteristic of the strain gauge itself and positional irregularity of the mounting thereof to the injection cylinder. In view of this, therefore, the pressure deviation computing unit or head amplifier is normally installed with a zero adjusting and a gain adjusting circuit whereby zero point and gain adjustments may be implemented at the stage of initial adjustment.

Regrettably, however, when a temperature drift occurs due to various factors such as the usage environment of an injection molding machine, time zone during which the machine is run and so forth, even if a zero point adjustment at the stage of initial adjustment is performed it may undergo some deviation from the adjusted point. Therefore, high-precision pressure detection cannot accurately be done and quality of molded products will deteriorate.

SUMMARY OF THE INVENTION

An object of the present invention is to provide a pressure detecting device for injection molding machines, which is capable of undertaking high-precision pressure sensing via constant maintenance of an accurately adjusted zero point, without being influenced by a temperature drift, whereby the molding quality of product may be improved.

In the present invention, with a view to achieve this object, when configuring a pressure detecting device provided with a hydraulic cylinder incorporating a double-rod type piston 3, for example, a pair of pressure sensors 4 and 5 detect the hydraulic pressures of fore and rear oil chambers 2f, 2r respectively of injection cylinder 2. A deviation computing unit 6 obtains detected pressure value Pd from the deviation between detected pressures oil chambers Pdf and Pdr based upon outputs of each pressure sensor 4 and 5. The device should be especially configured to comprise a correction value computing unit 7 which obtains a correction value A, the pressure detected value Pd during the period where the pressure detected value Pd becomes theoretically zero, correction value memory 8 which stores calculated correction value A, and pressure correcting unit 9 correcting pressure detected value Pd with the correction value A.

Thus, basically, the pressures of fore and rear oil chamber 2f, 2r of injection cylinder 2 are detected by pressure sensors 4 and 5. From the deviation between respective oil chamber internal pressure measurements Pdf, Pdr based on the outputs of pressure sensors 4 and 5, differential pressure computation unit 6 calculates the intended detected pressure value Pd. This value is the difference between the measurement Pdf and Pdr.

During the run of an injection molding machine, there exists a period Ts during which said detected pressure Pd becomes zero theoretically. For example, since no pressure control is implemented during a prescribed period, for example, which follows the completion of initialization with the power supply turned on or a prescribed period subsequent to the completion of an injection process, each of these periods is the period Ts during which detected pressure value Pd becomes theoretically zero. Noting the existence of this period Ts, the pressure sensing device of the present invention automatically corrects the detected pressure value Pd at the time of pressure sensing, with the correction value A which is obtained during period Ts.

Namely, as the detected pressure value Pd obtained from deviation computing device 6 during period Ts is a margin of error during period Ts where detected pressure value Pd becomes zero theoretically (fundamentally), correction value computing unit 7 computes beforehand pressure value Pd of that time as correction value A. Averaging detected pressure values Pd which have been obtained through plural times sampling when obtaining correction value A will lessen the margin of error of correction value A. Correction value A obtained in this way is stored in correction value memory 8.

Meanwhile, during pressure sensing for pressure control, etc., detected pressure value Pd calculated by deviation computing unit 6 is corrected by pressure correcting unit 9 according to correction value A stored in correction value memory 8. Namely, the correction value A is added to or subtracted from calculated detected pressure value Pd, whereby accurate detected pressure value Pda is obtained as a result.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

The preferred embodiments of the present invention are illustrated hereunder in detail with reference to the accompanying drawings.

Figure 1:
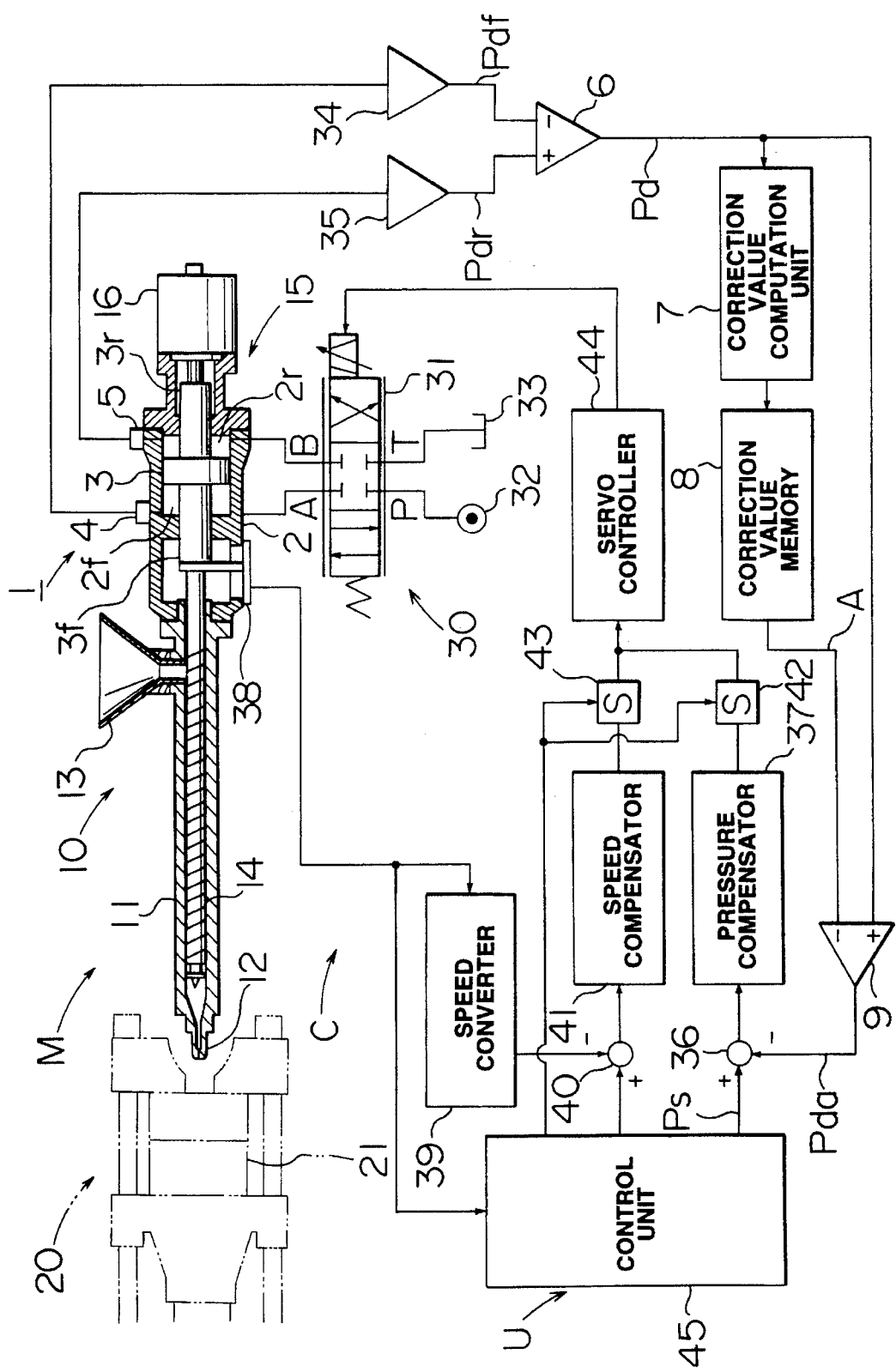
FIG. 1 is a block diagram illustrating the injection molding machine including a pressure sensing device to which the present invention relates.

First with reference to FIG. 1, the configuration of injection molding machine M installed with pressure sensing device 1 in one preferred embodiment of the present invention is illustrated.

Injection molding machine M comprises injection unit 10 and die clamping unit 20. Injection unit 10 has barrel cylinder 11 with injection nozzle 12 mounted at the fore end thereof and hopper 13 at the rear end thereof. A screw 14 is incorporated in the barrel cylinder 11 screw drive 15 is coupled to the rear end of said barrel cylinder. Screw drive 15 includes injection cylinder (hydraulic cylinder) 2 with a built-in double-rod type piston 3. A fore rod 3f of piston 3 is coupled to the rear end of screw 14 while rear rod 3r is spline-joined to the shaft of oil motor 16 arranged at the rear end of injection cylinder 2. Further, the diameters of fore and rear rod 3f, 3r are identical. Die clamping unit 20 illustrated in an imaginary line supports dies 21 and opens and closes the dies 21.

The hydraulic control circuit C is connected to injection cylinder 2. Hydraulic control circuit C includes hydraulic circuit 30 and control circuit U. Hydraulic circuit 30 is provided with a four-port servo valve 31. Port A of valve 31 is joined to fore oil chamber 2f of injection cylinder 2. Port B of valve 31 is joined to rear oil chamber 2r. The port P is joined to a source of hydraulic pressure (a hydraulic pump or an accumulator) 32 and port T is joined to oil tank 33.

The control circuit U is connected to the pressure sensing device 1. Pressure sensing device 1 includes pressure sensor 4 with a strain gauge to detect the hydraulic pressure within fore oil chamber 2f of injection cylinder 2. The pressure sensor 5 is identical with pressure sensor 4 and detects the hydraulic pressure in rear oil chamber 2r of injection cylinder 2. Head amplifiers 34, 35, each include a bridge circuit connected to pressure sensors 4 and 5. The deviation computing unit 6 calculates detected pressure value Pd, intended to be obtained, from the difference between oil chamber internal pressure measurements of Pdf and Pdr outputted from head amplifiers 34, 35. The calculated detected pressure value Pd becomes the detected value of injection pressure or holding pressure. Pressure sensing device 1 according to the present invention further includes correction value computing unit 7 with a function to obtain as correction value A the detected pressure value Pd obtainable from deviation computing unit 6 during period Ts over which detected pressure value Pd becomes theoretically zero. A correction value memory 8 stores calculated correction value A and pressure correcting unit 9 which corrects detected pressure value Pd with said correction value A at the time of pressure sensing, namely, by adding said correction value to or subtracting from the detected pressure value Pd.

Meanwhile, in control circuit U, deviation detector 36 obtains the difference between detected pressure value Pda which is obtained from pressure correcting unit 9 and previously set pressure Ps. A pressure compensating unit 37 obtains a pressure manipulated variable being pressure compensated against the deviation confirmed by deviations detector 36. A position sensor 38 detects the position of screw 14. This position is sent to a speed converting unit for obtaining a screw speed from the screw position detected by position sensor 38. A deviation detecting unit 40 obtains the deviation between a detected speed provided by speed converting unit 39 and a set speed. A unit 41 will then speed compensating unit to provide a speed manipulated variable being speed compensated to respective switching function units 42, 43 for selecting pressure and speed manipulated variables. A servo controller 44 will then convert a pressure or a speed manipulated variable into a control signal thereby to regulate servo valve 31. A control unit 45 regulates various controls (servo sequence control, machine control, etc.).

Figure 2:
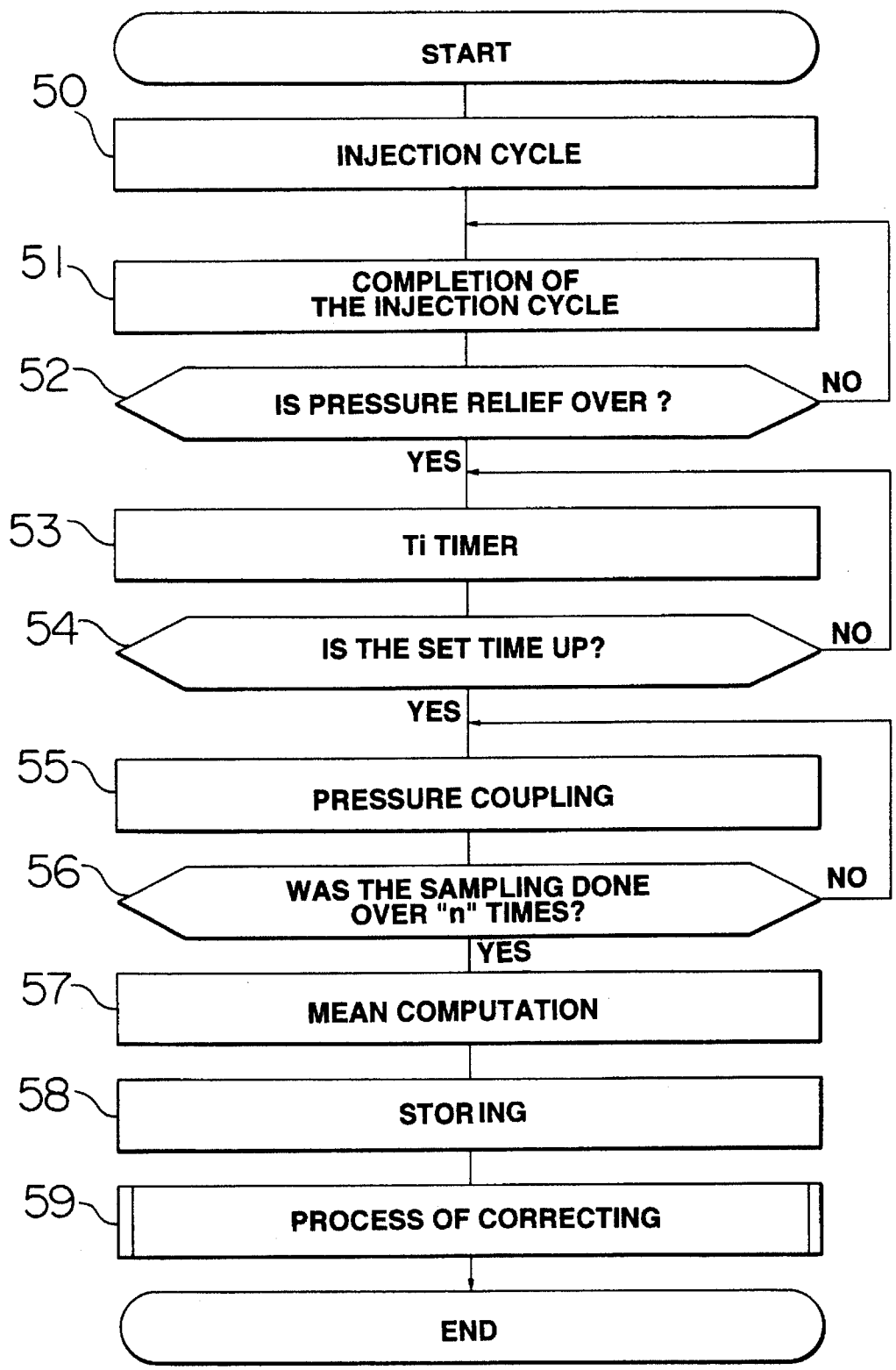
FIG. 2 is a flowchart depicting the process of pressure sensing with the pressure sensing device of the present invention.

Next, referring to FIG. 1 and FIG. 2, a description is made hereunder about a part of the controls concerned with the operation of the injection molding machine M, including the performance (pressure sensing method) of pressure sensing device 1 in the preferred embodiment of the present invention.

Basically with pressure sensing device 1, the pressures of fore and rear oil chamber 2f, 2r of injection cylinder 2 are detected by pressure sensors 4, 5. After the measurements of these pressures are amplified by head amplifiers 34, 35, they are transferred subsequently to deviation computing unit 6. A pressure value Pd which is the difference between oil chamber internal pressures Pdf and Pdr outputted from head amplifiers 34 and 35 is obtained.

Incidentally a given period subsequent to the completion of an injection process becomes period Ts, during which the difference between the respective measurements of fore and rear oil chamber internal pressures based on the outputs of sensors 4, 5 becomes theoretically zero for no pressure control is undertaken during this period. Namely, as shown in FIG. 3, the injection process comprises a speed control zone within which an injection and a fill-up step is effected, and a pressure control zone wherein pressure holding is carried out, and the so-called relief of pressure is performed, following the ending of pressure control zone at point Se, whereby rear oil chamber 2r of injection cylinder 2 opens to oil tank 33 (steps 50 through 52).

Figure 3:
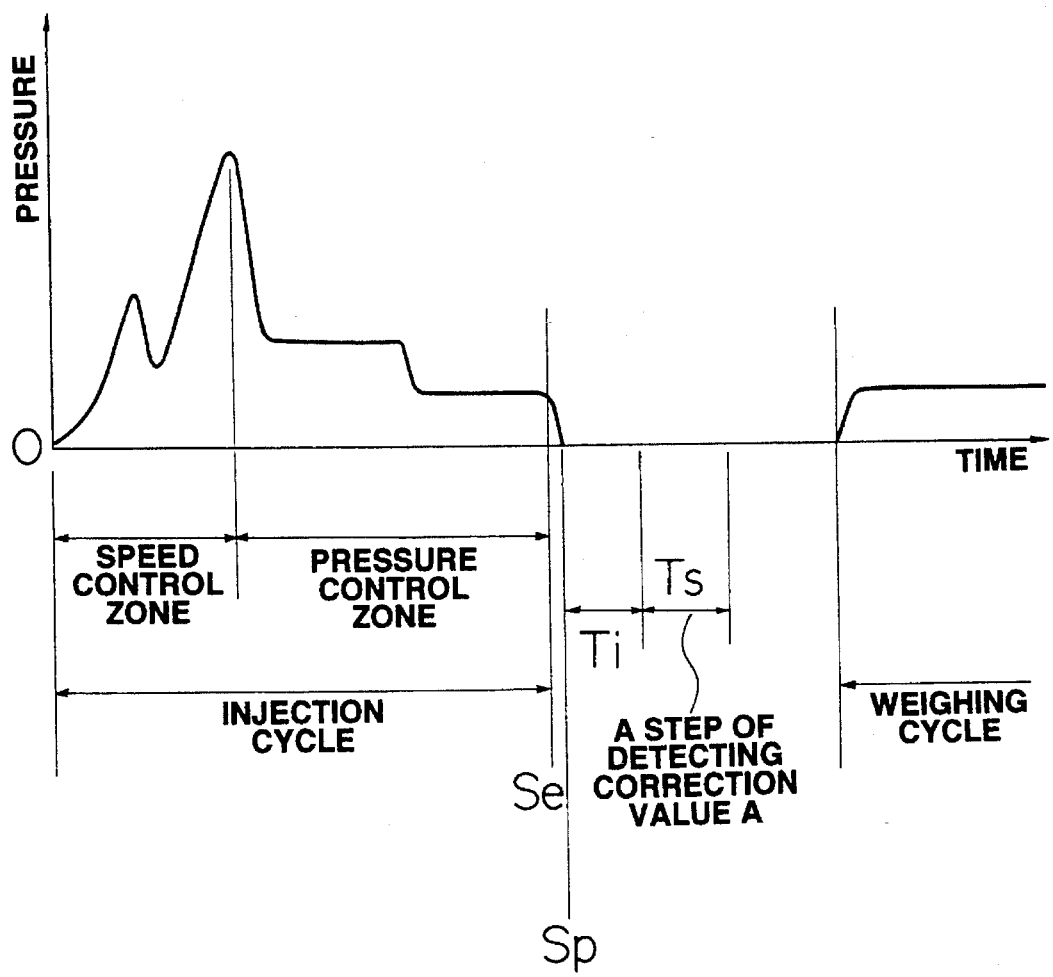
FIG. 3 is a timing chart showing the profile of pressure changing to illustrate the pressure sensing process using the pressure sensing device to which the present invention relates.

Control unit 45 monitors the relief of pressure under way, and when point Sp specified in FIG. 3 where the pressure relief ends, is reached, correction value computing unit 7 calculates correction value A. To be more particular, correction value computing unit 7 with its timer function counts up (step 53) given time interval Ti, followed by sampling to detected pressure value Pd obtained by deviation computing unit 6 (steps 54, 55) after a certain time is up. In this case the sampling is done "n" times according to a certain cycle. Further, in view of the fact that the detected pressure value Pd undergoing sampling is the detected pressure value Pd of period Ts during which it becomes theoretically zero, it is considered as an error of pressure produced in consequence of a pressure drift. Meanwhile, when the number of sampling reaches "n" times (step 56), correction value computing unit 7 calculates (step 57) the mean value of each sampled detected pressure value Pd. The calculated mean value is subsequently stored (step 58) as correction value A in correction value memory 8.

On the other hand, in the next injection process wherein pressure control is performed, detected pressure value Pd is subjected to correction with the stored correction value A. In this case, since feed back control of pressure is performed during control of pressure, first the pressure sensing device 1 detects the detected pressure value Pd. Namely, the respective pressures of fore and rear oil chamber 2f, 2r of injection cylinder 2 are detected by sensors 4, 5, and subsequently, deviation computing unit 6 calculates the detected pressure value Pd from the difference between detected fore and rear oil chamber internal pressure Pdf and Pdr based on the outputs of pressure sensors 4, 5. The information of both calculated detected pressure value Pd, and correction value A stored in correction value memory 8 is transferred to pressure correcting unit 9 wherein calculated detected pressure value Pd undergoes correction (step 59) by the correction value A. More precisely, the correction is effected with correction value A either being added to or subtracted from calculated detected pressure value Pd, whereby corrected accurate detected pressure value Pda may be obtained.

Further, the detected pressure value Pda after being corrected and obtained from pressure sensing device 1 is transferred to deviation detector 36 wherein the deviation between said detected pressure value Pda and previously set pressure setting value Ps is obtained. This deviation of pressure goes through pressure compensation by pressure compensating unit 37, and transferred to servo controller 44 as a pressure manipulated variable. As a result, a control signal from servo controller 44, is given to servo valve 31, to control hydraulic pressure while pressure regulated oil is supplied to fore and rear oil chamber 2f, 2r of injection cylinder 2 to press screw 14. On the other hand, since detected pressure value Pda is available from pressure sensing device 1, the pressure feedback system effects pressure control in a manner that detected pressure value Pda matches pressure setting value Ps. In this case, switching function unit 43 is turned OFF and switching function unit 42 is turned ON by control unit 45.

Incidentally, for pressure sensors 4, 5, an allowable range of pressure drift (approximately 10% of their pressure rating) is prescribed. Therefore, should each of these pressure sensors be found to have gone through zero correction beyond prescribed value, these pressure sensors may be considered to be defective or malfunctioning. Therefore, in case of such trouble, actuating an alarm or suspending the control thus far in progress must be done.

One preferred embodiment of the present invention has been described in the foregoing, but the present invention is by no means limited to such an embodiment referred to above. For example a case of configuring the above preferred embodiment with hardware has been explained. However, the same process may be performed with software. The case of detecting pressure of a piston in an injection cylinder has been illustrated, however, the subject pressure sensing device of the present invention is likewise applicable to another hydraulic cylinder such as a die clamping cylinder, etc. Furthermore, in said embodiment, a given period subsequent to the completion of the injection cycle is exemplified as a period during which the differential pressure becomes theoretically zero but the given period may be a period after the completion of initialization with the power supply turned on or another but similar period may be selected. Particularly, the fact that the detected pressure value theoretically becomes zero includes not only the instance where each of the pressure measurements of fore and rear oil chambers are zero but also another instance where the respective pressure measurements of these oil chambers is given with an identical pressure as when screw position control is carried out. With the pressure sensing device of the present invention it is allowed that the frequency of calculating correction value and the number of samplings or the timing, etc. (interval of correction) correction with corrected value may be selected optionally. Further, the subject pressure sensing device may have its configurational particulars, processing method, and so forth modified within the spirits and scope of the invention.

I claim:

1. A pressure sensing device for an injection molding machine, the injection molding machine having a hydraulic cylinder with fore and rear oil chambers and a double-rod piston, the pressure sensing device comprising:

a pair of pressure sensors for simultaneously detecting hydraulic pressure in the fore and rear oil chambers of the hydraulic cylinder;

a deviation computing unit for calculating a detected pressure value from a difference between pressures of the fore and rear oil chambers detected by the pair of pressure sensors;

correction value computing means for calculating a correction value of a period wherein the detected pressure value becomes theoretically zero;

correction value memory for storing a calculated correction value;

a pressure correcting unit for correcting the detected pressure value at a time of pressure sensing, the detected pressure value being corrected with the correction value; and a controller for controlling movement of the piston in the injection molding machine using the detected pressure value.

2. The pressure sensing device for an injection molding machine as claimed in claim 1, wherein the correction value computing means calculates the correction value during a predetermined period subsequent to completion of initialization after a power supply is turned on.

3. The pressure sensing device for an injection molding machine as claimed in claim 1 wherein the correction value computing means calculates the correction value during a predetermined period subsequent to completion of an injection cycle.

4. The pressure sensing device for an injection molding machine as claimed in claim 1, wherein the correction value computing means calculates the correction value by averaging detected pressure values obtained by a plurality of samplings.

5. The pressure sensing device for an injection molding machine as claimed in claim 1, further comprising error processing means for determining when the correction value exceeds a prescribed value.

6. The pressure sensing device for an injection molding machine as claimed in claim 1, wherein the hydraulic cylinder is an injection cylinder.

7. A pressure sensing device for an injection molding machine, the injection molding machine having a hydraulic cylinder with fore and rear oil chambers and a double-rod piston, the piston being connected to a screw, the pressure sensing device comprising:

a fore pressure sensor for simultaneously detecting hydraulic pressure in the fore oil chamber of the hydraulic cylinder;

a rear pressure sensor for detecting hydraulic pressure in the rear oil chamber of the hydraulic cylinder;

a screw position sensor for detecting a position of the screw;

a deviation computing unit operatively connected to the fore and rear pressure sensors, the deviation computing unit calculating a detected pressure value from a difference between pressures of the fore and rear oil chambers detected by the fore and rear pressure sensors;

correction value computing means for calculating a correction value of a period wherein the detected pressure valve becomes theoretically zero, the correction value computing means being operatively connected to the deviation computing unit;

correction value memory for storing a calculated correction value from the correction value computing means, the correction value memory being operatively connected to the correction value computing means;

a pressure correcting unit for correcting the detected pressure value at a time of pressure sensing, the detected pressure value being corrected with the correction value, the pressure correcting unit being operatively connected to both the correction value memory and the deviation computing unit;

a control unit for storing pressures from prior injections of the molding machine, the control unit being operatively connected to the screw position sensor, a signal of the screw position being sent from the screw position sensor to the control unit;

a deviation detector for calculating a difference between a detected pressure value corrected by the pressure correcting unit and a previously set pressure stored in the control unit, the deviation detector being operatively connected to the pressure correcting unit and the control unit;

a pressure compensator operatively connected to the deviation detector, the pressure compensator receiving the difference calculated by the deviation detector;

means for controlling movement of the piston, the means for controlling being operatively connected to the pressure compensator, the pressure compensator sending a signal to the means for controlling to alter an amount of movement of the piston based on the difference calculated by the deviation detector.

8. The pressure sensing device for an injection molding machine as claimed in claim 7, wherein the correction value computing means calculates the correction value during a predetermined period subsequent to completion of initialization. after a power supply is turned on.

9. The pressure sensing device for an injection molding machine as claimed in claim 7, wherein the correction value computing means calculates the correction value during a predetermined period subsequent to completion of an injection cycle.

10. The pressure sensing device for an injection molding machine as claimed in claim 7, wherein the correction value computing means calculates the correction value by averaging detected pressure values obtained by a plurality of samplings.

11. The pressure sensing device for an injection molding machine as claimed in claim 7, further comprising error processing means for determining when the correction value exceeds a prescribed value.

12. The pressure sensing device for an injection molding machine as claimed in claim 7, wherein the hydraulic cylinder is an injection cylinder.

* * * * *